USO10071620B2

(12) United States Patent
Hunter

(10) Patent No.: US 10,071,620 B2
(45) Date of Patent: Sep. 11, 2018

(54) ELASTIC SNAP EXTENDER FOR AFFIXING A COVER TO A VEHICLE

(71) Applicant: Bryan W. Hunter, St. Clair Shores, MI (US)

(72) Inventor: Bryan W. Hunter, St. Clair Shores, MI (US)

( * ) Notice: Subject to any disclaimer, the term of this patent is extended or adjusted under 35 U.S.C. 154(b) by 0 days.

(21) Appl. No.: 15/342,643

(22) Filed: Nov. 3, 2016

(65) Prior Publication Data

US 2017/0127769 A1    May 11, 2017

Related U.S. Application Data

(60) Provisional application No. 62/252,062, filed on Nov. 6, 2015.

(51) Int. Cl.
    *B60J 7/00*     (2006.01)
    *B60J 7/10*     (2006.01)
    *B60J 11/02*    (2006.01)

(52) U.S. Cl.
    CPC ............ *B60J 7/104* (2013.01); *B60J 11/02* (2013.01)

(58) Field of Classification Search
    CPC ....... A44B 17/0041; B60J 11/02; B60J 7/104; B36B 17/02
    See application file for complete search history.

(56) References Cited

U.S. PATENT DOCUMENTS

| 586,139 | A | * | 7/1897 | Moss | A41F 1/00 24/301 |
|---|---|---|---|---|---|
| 1,083,573 | A | * | 1/1914 | Wehrwein | B60P 7/0823 24/302 |
| 3,112,491 | A | * | 12/1963 | Cleveland | A41F 1/00 2/88 |
| 5,111,554 | A | * | 5/1992 | Sweers | B60P 7/0823 24/16 R |
| 5,195,216 | A | * | 3/1993 | Ishii | B65D 63/14 24/129 A |
| 5,483,915 | A | * | 1/1996 | Clark | B63B 17/02 114/361 |
| 6,357,084 | B1 | * | 3/2002 | Haidon | A45C 1/00 24/16 R |
| 7,290,312 | B2 | * | 11/2007 | Kawensky | B63B 17/02 24/301 |
| 2012/0192384 | A1 | * | 8/2012 | Kelly | F16B 2/08 24/302 |
| 2015/0313325 | A1 | * | 11/2015 | West | A41H 43/00 428/99 |

* cited by examiner

*Primary Examiner* — David M Upchurch
(74) *Attorney, Agent, or Firm* — Bill C Panagos; Daniel J. Checkowsky; Panagos Law Group PLLC

(57) ABSTRACT

A snap fit extender fashioned from an elastic body material of a predetermined length with male and female snap fits at opposing ends of the elastic body in directionally opposite facing relation to each other. The snap fittings on the extender are cooperatively engageable to complimentary snap fittings on a cover and a vehicle and responsive to dimensional changes to the cover occasioned by weather or age related shrinkage without inducing harmful stresses into the cover.

5 Claims, 4 Drawing Sheets

US 10,071,620 B2

ELASTIC SNAP EXTENDER FOR AFFIXING A COVER TO A VEHICLE

CROSS-REFERENCE TO RELATED APPLICATION

This application claims priority to U.S. Provisional Patent Application No. 62/252,062 filed on Nov. 6, 2015, which is hereby incorporated by reference in its entirety.

TECHNICAL FIELD

In one embodiment, there is disclosed an elastic snap extender for affixing a cover to a vehicle. It has been observed that vehicle covers, such as boat canvas covers, vehicle storage covers, tonneau covers for convertible automobiles, or other covers may experience changes in size over the several seasons or even with a single season or single day that may make it difficult or impossible to affix the cover in place over the vehicle. Changes in temperature or humidity may affect the properties of the cover such that it may expand or shrink. In addition, exposure to the sun may affect the properties of cover material so that over time, it loses elasticity and/or may have a permanent change in overall dimension. This change in dimension is not predictable or uniform. For example, the cover may change in over length, but not so much in overall width. In addition, a cover that has been exposed to several seasons of sun light may become brittle, in which case attempts to stretch the material to fit could result in damage to the cover. There is a need for a snap extender that is resistant to ultra violet (UV) light to affix a cover to a vehicle that is able to accommodate changes in canvas or cover size over the useful life of the cover.

In the past, it had been the practice to fashion snap extenders from a non elastic body material with directionally opposite facing relation male and female snap fits at opposing ends of the body. It has been disclosed to use those snap extenders to extend the reach of the snap fitting along a side of a canvas that has experienced age or weather related size change, to affix it in place on a vehicle, such as a boat. Specifically, it had the practice to use a non elastic snap fit extender because it was believed that an elastic snap fit extender would introduce stresses into the canvas as the canvas experienced size change. The arrangement was not optimal as canvas or cover size changes are not uniform or predictable. It has been determined that a snap fit extender fashioned from an elastic body of a predetermined length with male and female snap fits at opposing ends of the elastic body in directionally opposite facing relation to each other as described herein provides superior holding to a canvas or other cover of a vehicle that is subjected to weather or age related shrinkage without inducing harmful stresses into the canvas cover. In addition, an elastic snap cover having resistance to UV light can extend the useful life of a canvas or cover for a vehicle such as a boat or car.

In addition, the snap fit straps of the present disclosure serve as auxiliary size adjusting strips with vehicle covers that self adjusts to an uneven shrinkage that may occur with a vehicle cover during weather, storage or age events.

DETAILED DESCRIPTION

Figure 1:
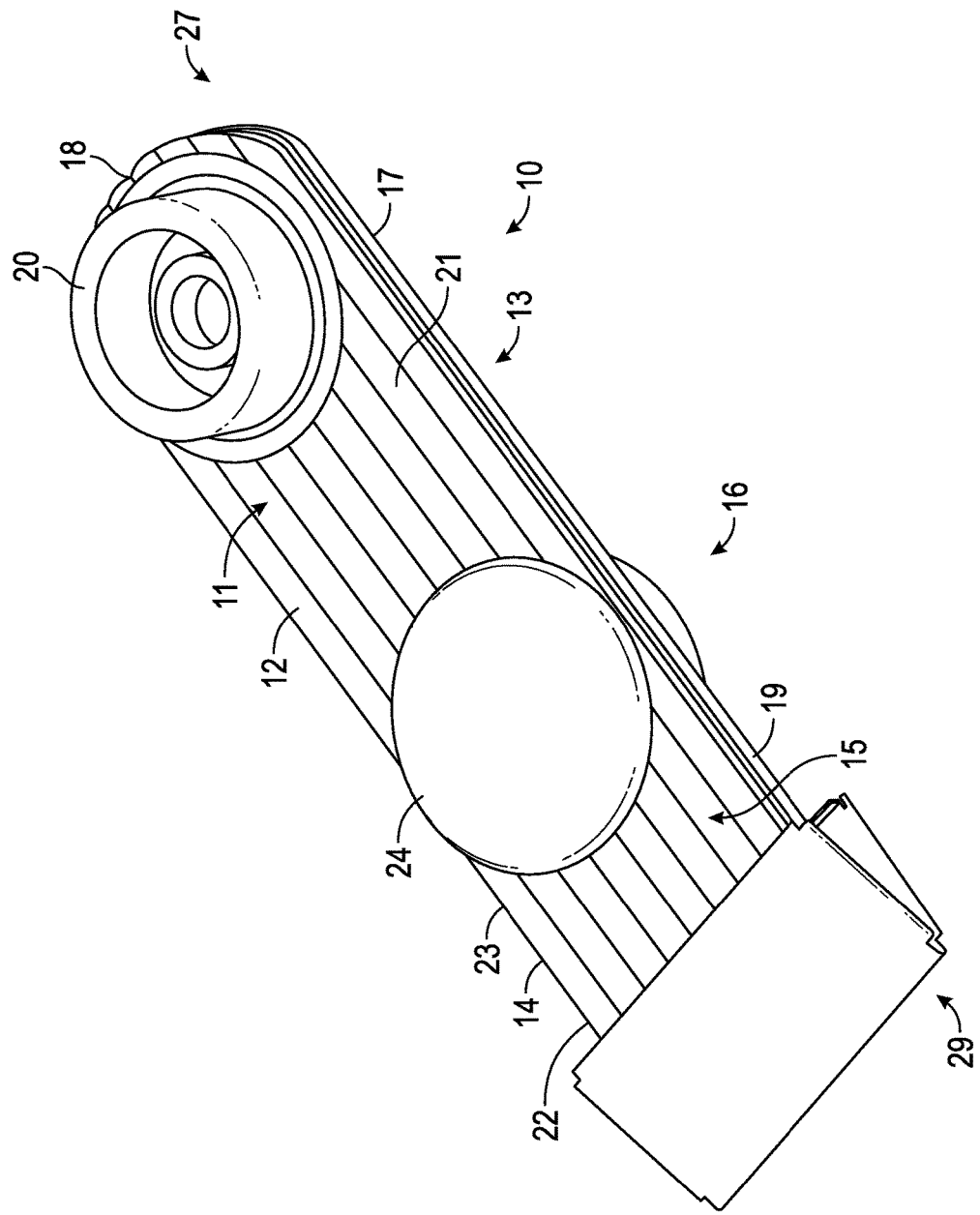
FIG. 1 is a perspective top view of one embodiment of a snap fit extender with an elastic body.
Figure 2:
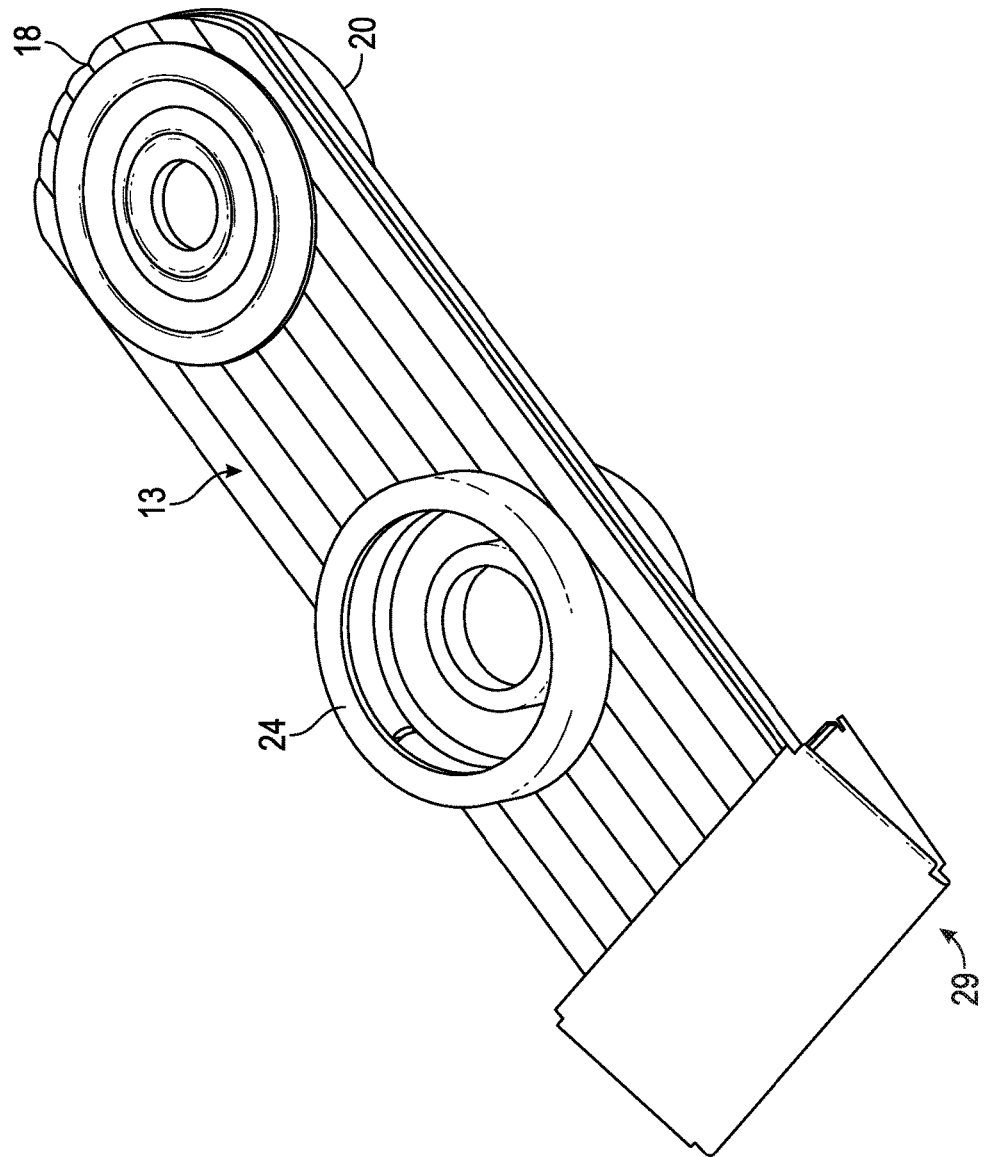
FIG. 2 is a perspective bottom view of one embodiment of a snap fit extender with an elastic body.

Turning now to the drawings wherein like numbers refer to like structures FIGS. 1 and 2 depict a snap extender 10 with an elastic body 12 having a predetermined length 14 and width 15. The body has a first surface 11 and an opposed second surface 13. The first and second surface may be comprised of individual layers 17 or sheets of parallel joined elastic chords in a woven material that are joined together along their length to form a joint line 23 that extends substantially along the length of the body. While the structure as shown has two such layers, it in understood that any number of such layers may be joined together to form a suitable body. The number of layers may be used to impart strength and elasticity to the body portion of the snap fit extender. A large and/or heavy cover material may require a stronger or more elastic snap fit extender body. By adding or subtracting layers from the body structure, a snap fit extender as described may be tailored for any application.

Figure 4:
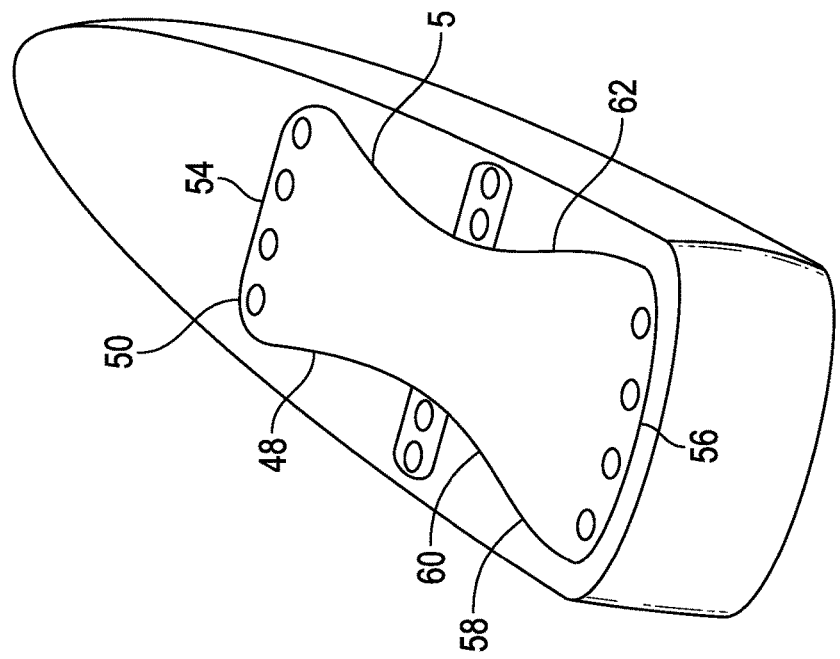
FIG. 4 is a perspective view of a boat with a snap fit cover that has experienced shrinkage, such that it no longer fits the boat
Figure 3:
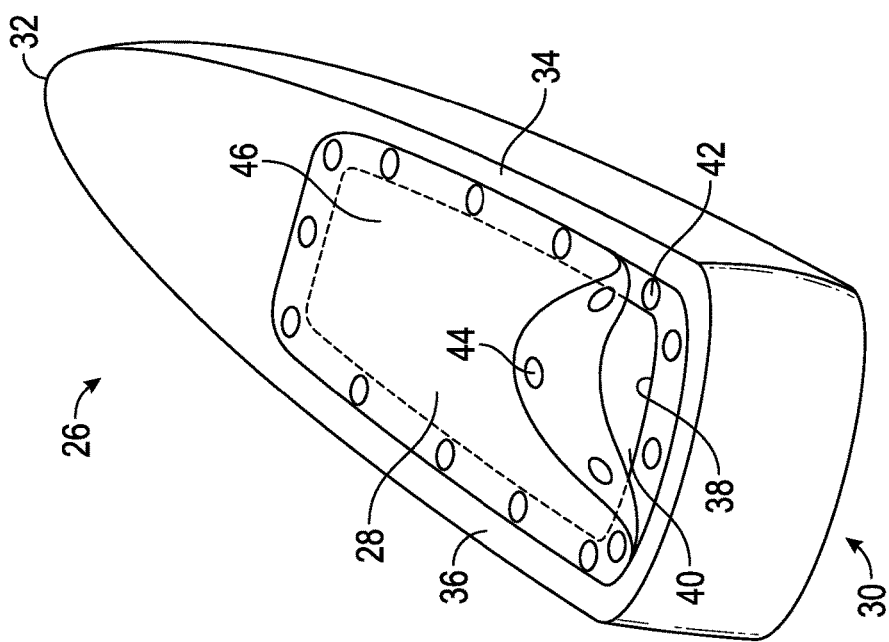
FIG. 3 is perspective view of a boat with a snap fit cover in place.

The elastic body may be of any shape and any dimension, and is shown herein as having a rectangular shape 16. The body may be comprised of a UV resistant elastic woven material enclosing several elastic polymer chords. An elastic polymer material such as a polyethylene or polypropylene material may be chosen as the woven material. The elastic material in the chords may also be UV resistant. The individual chords may be arranged in a woven pattern such as a herring bone or other patter as is known in the art for fashioning elastic bands. The chords may be arranged substantially parallel to each other along the width of the body and extend along the length of the body. Proximal to a first end 18 is a male snap fit 20, and proximal to a second end 22 is a female snap fit 24. The first end and the second end terminate respectively in surfaces or structures to prevent fraying of the snap fit extender body. For example, the first and second ends may be heat sealed (19, 21, respectively) at the desired length of the body to facilitate easy sizing of the elastic snap extender during manufacture. Other arrangements to size the snap fit extender may also be used, such as, without limitation, for example, applying a cross stitch or providing an aglet type or metal clamp 29 fitting at the first and/or second ends of the snap fit extender. The male and female snap fits are oriented in directionally opposite facing relation to each other on opposite surfaces of the snap fit extender elastic body and of such size and configuration as to cooperatively engage with male and female snaps on a vehicle, such as for example boat 26 and a canvas cover 28, respectively as seen in FIGS. 3 and 4. Those skilled in the art will recognize that while the snap fit body is described in as sheets joined together, the body may be a chord of elastic material with snaps affixed thereto in opposed relation at opposed ends to accomplish a similar function as the snap fit as described in this embodiment.

The vehicle, generally described as a boat, has a stern 30 and a bow 32 and opposing sidewalls or gunnels 34 and 36, respectively. These cooperatively form an interior wall 38 which in turn defines an interior space 40. Arranged around the gunnels and interior space are male snap fittings, generally designated as 42, which cooperate with female snap fittings 44 in covering 46 (which may be a canvas, leather or a vinyl material) to affix the covering in place over the interior space of the boat when the boat is not in use.

The cover 46 has a length 48 and a width 50 that are of sufficient dimensions as to substantially overlay the interior space and permit the fittings on the cover peripheral edges 52, 54, 56, and 58, respectively, to interact with the snap fittings on the boat. As may be appreciated, weather, temperature, UV exposure and age all affect the cover, causing it change dimensions, sometimes over a single day, and often not uniformly. For example, if it is cool, the cover may experience shrinkage, and if it is hot, it may expand. Further, as the cover ages, or exposure to UV light, it may experience drying, which can cause brittleness and shrink the cover dimensions. These changes may be represented by 60 and 62, wherein the covering has experienced dimension change and is no longer able to be fitted to the vehicle snap fittings.

Figure 5:
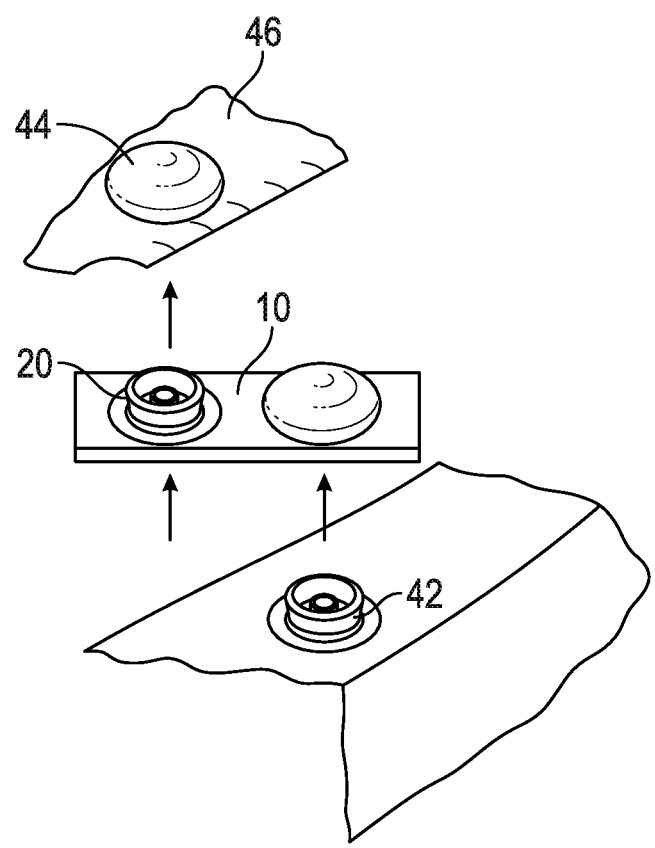
FIG. 5 is a partial perspective view of a boat cover with a male snap attachment at the boat and a female snap attachment at the cover.

FIG. 5 is a representation of a vehicle, such as a boat, an elastic snap fit extender and a snap fit of a cover for the vehicle. The male snap fitting on the vehicle cooperative engages the female snap fit on the elastic snap fit extender and the male snap fitting of the elastic snap fit extender cooperatively engages the female snap fitting of the cover.

In operation, the elastic snap fit extender may be used to connect the cover to the vehicle. When the vehicle cover experiences dimensional change (from age, temperature, UV exposure or weather), the entire cover dimensions may be affected, and such change may not be uniform over the entire cover. The elastic snap fittings as described are able to act individually to accommodate any change in dimension up to the limit of their elasticity, to retain the cover in place over the interior space of the vehicle without imparting undue stresses into the cover. In this respect, the elastic snap fit extender is self-adjusting, depending upon conditions that may affect the cover dimensions without any intervention by the user.

Those skilled in the art will recognize that the terms used in this specification are words of description and not words of limitation. Many variations and modifications are possible without departing from the scope and spirit of the invention.

What is claimed as new and desired to be protected by Letters Patent of the United States is:

1. A snap fit extender, comprising:
    an elastic body having a length and width, said body having elastic chords arranged substantially parallel to each other along the width of the body and extending along the length of the body; said body equipped with male a female snap fits at opposing first and second ends of the elastic body in operationally opposed facing relation; each said snap fit cooperatively engageable with a complimentary snap fitting on a cover and a vehicle; said elastic body responsive to dimensional changes to the cover occasioned by UV, weather, temperature or age related dimensional changes to limit stresses to said cover.

2. The snap fit extender of claim 1, wherein said elastic body is comprised of at least two layers of elastic material; said material having resistance to ultraviolet light induced degradation.

3. The snap fit extender of claim 1, wherein said body is comprised of at least one elastic chord is an ultraviolet resistant woven elastic polymer material.

4. The snap fit extender of claim 1, wherein at least one said end is heat sealed.

5. The snap fit extender of claim 1, wherein at least one end is terminated with an aglet, a clamp or a cross stitch.

* * * * *